(12) United States Patent
Tarrier et al.

(10) Patent No.: US 10,975,500 B2
(45) Date of Patent: Apr. 13, 2021

(54) METHOD OF NON-WOVEN FABRICS INCLUDING A COMPONENT

(71) Applicant: adidas AG, Herzogenaurach (DE)

(72) Inventors: James Tarrier, Nuremberg (DE); Brian Hoying, Herzogenaurach (DE); David Drury, Hemhofen (DE); Tom Henwood, Nuremberg (DE); Daniel Cocking, Herzogenaurach (DE); Andreas Seefried, Veitsbronn (DE)

(73) Assignee: adidas AG, Herzogenaurach (DE)

( * ) Notice: Subject to any disclaimer, the term of this patent is extended or adjusted under 35 U.S.C. 154(b) by 391 days.

(21) Appl. No.: 15/816,141

(22) Filed: Nov. 17, 2017

(65) Prior Publication Data
US 2018/0148861 A1 May 31, 2018

(30) Foreign Application Priority Data
Nov. 28, 2016 (DE) .......................... 102016223571.0

(51) Int. Cl.
*D01D 11/06* (2006.01)
*A43B 23/02* (2006.01)
(Continued)

(52) U.S. Cl.
CPC ............ *D01D 11/06* (2013.01); *A43B 1/0063* (2013.01); *A43B 1/02* (2013.01); *A43B 1/04* (2013.01); *A43B 23/0205* (2013.01); *A43B 23/0215* (2013.01); *A43B 23/0225* (2013.01); *A43B 23/0255* (2013.01); *A43B 23/042* (2013.01); *B29D 35/126* (2013.01); *B29D 35/128* (2013.01); *B29D 35/146* (2013.01); *B29D 35/148* (2013.01); *D01D 5/0985* (2013.01); *D04H 1/4374* (2013.01); *D04H 1/56* (2013.01); *D04H 1/76* (2013.01); *D04H 3/07* (2013.01);
(Continued)

(58) Field of Classification Search
CPC ..................................................... D01D 11/06
See application file for complete search history.

(56) References Cited

U.S. PATENT DOCUMENTS

| 4,741,941 A | 5/1988 | Englebert et al. |
| 5,575,874 A | 11/1996 | Griesbach, III et al. |

(Continued)

FOREIGN PATENT DOCUMENTS

| CN | 102345210 | 2/2012 |
| CN | 202969127 | 6/2013 |

(Continued)

OTHER PUBLICATIONS

European Patent Application No. 17203193.2, Office Action dated Dec. 18, 2018, 5 pages.
(Continued)

*Primary Examiner* — Larry W Thrower
(74) *Attorney, Agent, or Firm* — Kilpatrick Townsend & Stockton LLP

(57) ABSTRACT

A method of manufacturing a non-woven fabric includes the steps of: (a.) providing a substrate, wherein the substrate is air permeable in at least a portion of its surface; (b.) providing a fiber transfer device adapted to transfer fibers onto the substrate; (c.) transferring a first plurality of fibers onto the substrate; and (d.) applying a pressure differential to the air permeable portion of the substrate, wherein the strength of the pressure differential is varied across the surface of the substrate.

19 Claims, 6 Drawing Sheets

(51) Int. Cl.
*D04H 1/76* (2012.01)
*B29D 35/12* (2010.01)
*B29D 35/14* (2010.01)
*D04H 3/07* (2012.01)
*A43B 1/02* (2006.01)
*D04H 1/4374* (2012.01)
*A43B 1/00* (2006.01)
*D04H 1/56* (2006.01)
*D04H 3/16* (2006.01)
*A43B 1/04* (2006.01)
*A43B 23/04* (2006.01)
*D01D 5/098* (2006.01)

(52) U.S. Cl.
CPC ........... *D04H 3/16* (2013.01); *D10B 2331/10* (2013.01); *D10B 2501/043* (2013.01)

(56) References Cited

U.S. PATENT DOCUMENTS

| | | |
|---|---|---|
| 2006/0276095 A1 | 12/2006 | Dua et al. |
| 2010/0186874 A1 | 7/2010 | Sussmann |
| 2011/0250378 A1 | 10/2011 | Eaton et al. |
| 2013/0285294 A1 | 10/2013 | Huang et al. |
| 2013/0320584 A1 | 12/2013 | Davis et al. |
| 2015/0008610 A1 | 1/2015 | Bordin et al. |

FOREIGN PATENT DOCUMENTS

| | | |
|---|---|---|
| CN | 105120818 | 12/2015 |
| CN | 105765124 | 7/2016 |
| DE | 102005004454 | 10/2006 |
| EP | 2412856 | 1/2014 |
| GB | 1363675 | 8/1974 |
| JP | 0465568 | 3/1992 |
| JP | 05186949 | 7/1993 |
| JP | 07132206 | 5/1995 |
| JP | 3074549 B2 | 8/2000 |
| JP | 2002242069 | 8/2002 |
| JP | 2002273121 | 9/2002 |
| JP | 2010534535 | 11/2010 |
| JP | 2012031555 | 2/2012 |
| JP | 2012513547 | 6/2012 |
| JP | 2015522722 | 8/2015 |
| JP | 2016052721 | 4/2016 |
| WO | 9216361 | 10/1992 |
| WO | 2012052535 | 4/2012 |
| WO | 2014167420 | 10/2014 |
| WO | 2016077221 | 5/2016 |
| WO | 2016099687 | 6/2016 |

OTHER PUBLICATIONS

Japanese Patent Application No. 2017-226406, Office Action dated Jun. 11, 2019, 6 pages (English machine translation provided).
European Application No. 17203193.2, European Search Report dated Apr. 24, 2018, 9 pages.
Japanese Application No. 2017-226406, Office Action dated Oct. 30, 2018, 8 pages (4 pages of English translation and 4 pages of Original document).
Foundation of Nonwoven Fabric, Textile Machinery Society of Japan, pp. 119-124, Aug. 25, 1993 (Document showing a technique; English translation of relevant parts provided).
German Patent Application No. 102016223571.0, Office Action dated Jul. 19, 2017, 7 pages (No English translation available. A summary of the Office Action is provided in the Transmittal Letter submitted herewith).
Chinese Patent Application No. 201711214008.8, Office Action, dated Jan. 19, 2020, 21 pages (English machine translation provided).
German Patent Application No. 2016223571.0, Office Action, dated Feb. 22, 2018, 10 pages (English machine translation provided).
European Patent Application No. 17203193.2, Office Action, dated Aug. 22, 2019, 5 pages.

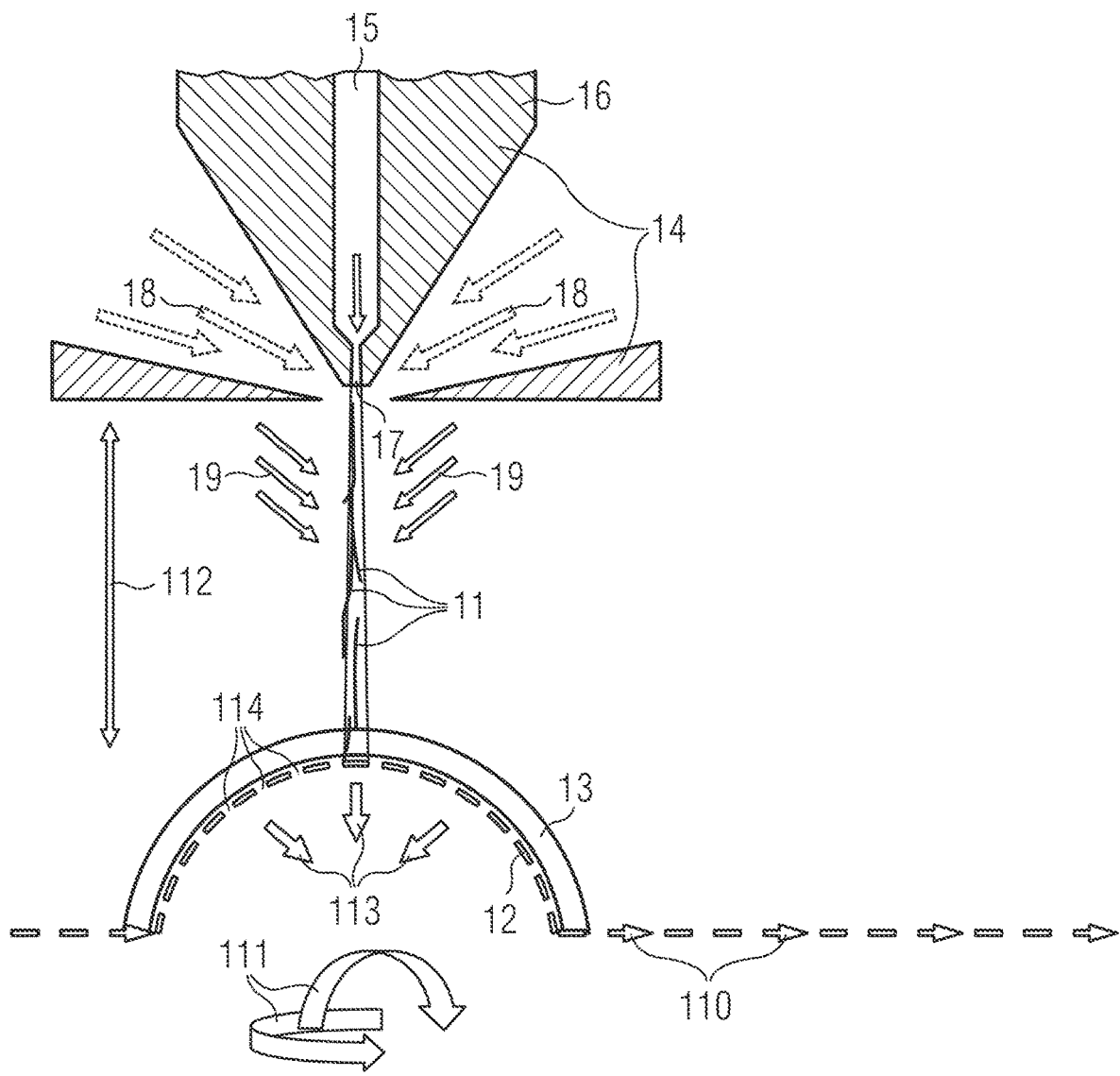

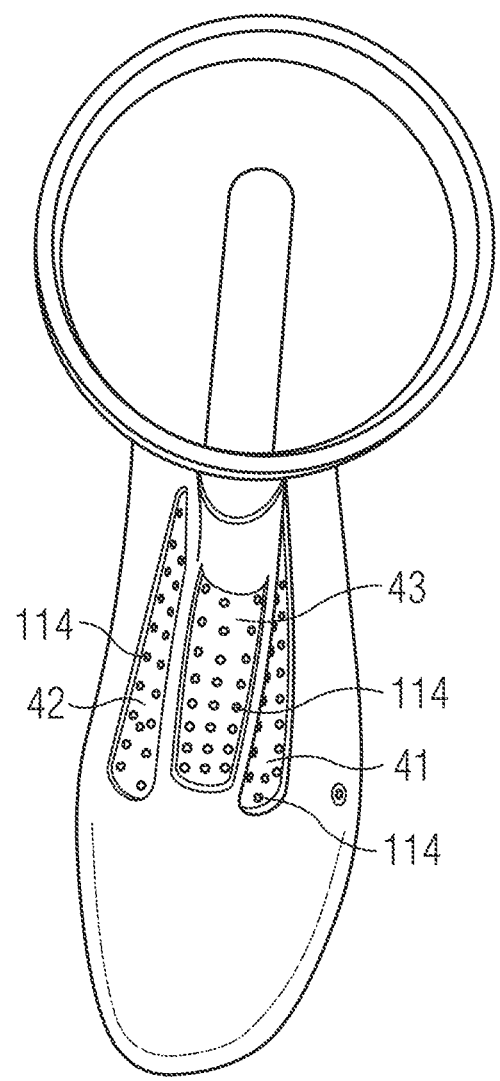

METHOD OF NON-WOVEN FABRICS INCLUDING A COMPONENT

CROSS REFERENCE TO RELATED APPLICATION

This application is related to and claims priority benefits from German Patent Application No. DE 10 2016 223 571.0, filed on Nov. 28, 2016 and entitled MANUFACTURING OF NON-WOVEN FABRICS INCLUDING A COMPONENT, the content of which is hereby incorporated by reference in its entirety.

FIELD OF THE INVENTION

The present invention relates to a method of manufacturing a three-dimensional non-woven fabric and to a non-woven fabric obtained by such a method.

BACKGROUND

Non-woven fabrics are made from fibers bonded together by chemical, mechanical, heat or solvent treatment. Different than woven or knitted fabrics, the fibers in non-woven fabrics are not present as yarns which are mechanically fixed by a mesh or loop structure. Non-woven fabrics are used for wide variety of products and articles including shoes, apparel and sports equipment.

For example, US 2006/0276095 A1 relates to an article of footwear of non-woven material and a method of manufacturing the same.

WO 2016/099687 A1 is directed to a non-woven material, method of making the same, and articles incorporating the non-woven material.

WO 2014/167420 A2 relates to an apparatus for producing non-woven product in a non-industrial environment.

GB 1 363 675 is directed to a method of making shoes.

EP 2 412 856 B1 relates to an apparatus for fabricating a three-dimensional non-woven fabric structure.

The non-woven fabrics in such articles is often not very rigid and resistant.

It is therefore the technical problem underlying the present invention to provide a method of manufacturing a stable and durable non-woven fabric in an efficient and cost-effective manner.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

According to certain examples, a method of manufacturing a non-woven fabric includes: (a.) providing a substrate, wherein the substrate is air permeable in at least a portion of its surface; (b.) providing a fiber transfer device adapted to transfer fibers onto the substrate; (c.) transferring a first plurality of fibers onto the substrate; and (d.) applying a pressure differential to the air permeable portion of the substrate, wherein the strength of the pressure differential is varied across the surface of the substrate.

In some examples, the air permeable portion comprises a plurality of holes. In various examples, the method includes placing a component at least partially onto the first plurality of fibers transferred to the substrate and transferring a second plurality of fibers onto at least a portion of the component and onto at least a portion of the first plurality of fibers.

According to certain aspects, the surface area of the component is smaller than the surface area of the non-woven fabric and the component is placed such that it is embedded in the non-woven fabric. In some cases, the component includes at least one appendix adapted to be surrounded by fibers. In various aspects, the component includes at least one opening such that fibers of the second plurality of fibers applied inside the opening are transferred onto the first plurality of fibers. In some examples, the component includes a textured surface. In various embodiments, at least one surface of the component includes a meltable layer, and a melting temperature of the meltable layer is below a temperature of the fibers when hitting the component. According to some examples, the method includes transferring at least a third plurality of fibers onto the substrate after the first plurality of fibers or after the second plurality of fibers, where the material of the third plurality of fibers differs from the material of the first plurality of fibers or of the second plurality of fibers.

In various examples, the method includes feeding the fiber transfer device with a thermoplastic polyurethane. In some cases, the fiber transfer device is a meltblown head including a plurality of nozzles, and the method further includes feeding at least a first nozzle with a first material and feeding at least a second nozzle with a second material, where the first material is different from the second material. In some cases, the method includes feeding at least one nozzle with a first material and a second material in a side-by-side configuration.

In various aspects, the method includes transferring a first material for a first time duration and transferring a second material for a second time duration, where the first material is different from the second material. According to certain examples, the method includes transferring a first material onto a first portion of the substrate and transferring a second material onto a second portion of the substrate, where the first material is different from the second material.

In some cases, the method includes controlling at least one of the distance between the fiber transfer device and the substrate or the speed of relative movement between the fiber transfer device and the substrate. In various embodiments, the method includes covering the substrate at least partly with a base layer and transferring at least a portion of the first plurality of fibers or a portion of the second plurality of fibers onto the base layer. According to certain examples, the base layer comprises at least one of a woven, non-woven or knitted fabric.

In various aspects, the method includes placing a removable membrane over the non-woven fabric while it is located on the substrate. In some cases, the method includes applying heat to the non-woven fabric while it is located on the substrate.

According to certain examples, a non-woven fabric manufactured according to the method is provided.

Various implementations described in the present disclosure can include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

Possible embodiments of the present invention are further described in the following detailed description, with reference to the following figures:

FIG. 1 is schematic of a meltblown process according to an embodiment of the present invention.

FIG. 4C illustrates another arrangement of holes of the substrate of FIG. 4A according to an embodiment of the present invention.

BRIEF DESCRIPTION

Figure 2A:
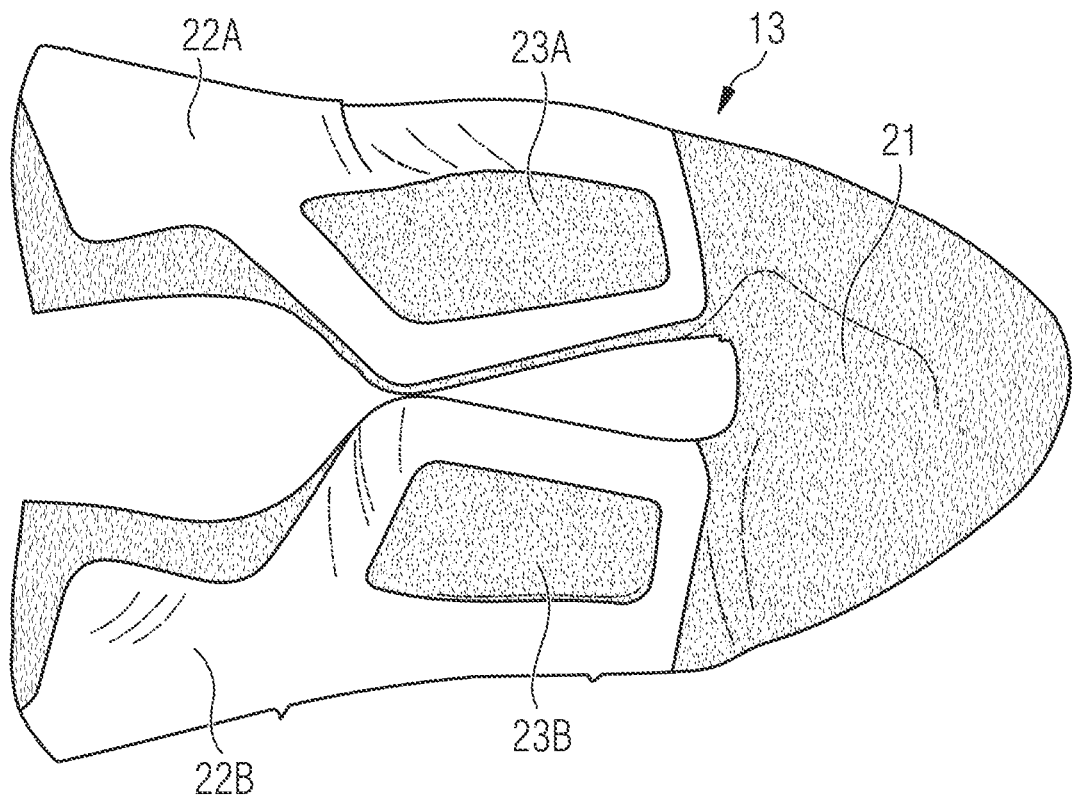
FIG. 2A illustrates a portion of a non-woven fabric obtained according to a method of the present invention configuration according to an embodiment of the present invention in a planar, two-dimensional.

According to a first aspect of the present invention, this problem is solved by a method of manufacturing a non-woven fabric, comprising the steps of (a.) providing a substrate, wherein the substrate is air permeable in at least a portion of its surface; (b.) providing a fiber transfer device adapted to transfer fibers onto the substrate; (c.) transferring a first plurality of fibers onto the substrate; and (d.) applying a pressure differential to the air permeable portion, wherein the strength of the pressure differential is varied across the surface of the substrate.

According to the invention, the substrate is air permeable in at least a portion of its surface, and the method comprises the step of applying a pressure differential to the air permeable portion. More particularly, the pressure differential may be applied so that the fibers transferred onto the substrate are attracted by the pressure differential. This allows to compact the fibers together to obtain a more dense non-woven fabric. On the other hand, the fibers are not compacted in those areas of the surface of the substrate not being air permeable, for example. Thus, it is possible to provide a non-woven fabric with padded zones (non-compacted fibers) and areas with increased structural strength (compacted fibers).

Suction provided by a pressure differential is especially advantageous with concave three-dimensional substrates because the fibers otherwise have a tendency to bridge across the concave portions of such a shape. With a pressure differential, and in some embodiments with a higher pressure differential applied in the concave portions of the substrate, the fibers are sucked in the concave portions such that they conform to the shape of the substrate.

According to the invention, the pressure differential may be varied across the surface of the substrate. In this way, the fibers may be compacted to a different degree across the non-woven fabric. In this way, the thickness of the non-woven fabric may be locally varied. Furthermore, a variation of the pressure differential may influence the trajectories of the fibers to guide the fibers to specific locations on the substrate. In particular, the fibers may be guided to concave areas (or recesses) where the fibers may accumulate to create, for example, a padding portion.

Through varying the air-permeability of the substrate, the substrate may comprise different air permeable areas with different local air permeability averages. For example, some portions may be non-permeable, while at least one other portion may be air permeable.

The air permeable portion may comprise a plurality of holes. This allows to vary the air permeability in a rather simple way, by varying, for example, the density and/or diameter of the holes across the surface of the substrate.

The substrate may be a three-dimensional shape. The three-dimensional shape may be a three-dimensional shape comprising a combination of convex and concave portions of surface. The three-dimensional shape may, for example, be a last of a shoe or a shape of a bra or of a torso. It may also be a ball shape, such as the shape of a ball bladder. The non-woven fabric may be a portion of an apparel, shoe, or sports equipment. Thus, no additional forming of the non-woven fabric is required as it is directly made to its useful shape.

Forming the non-woven fabric directly on a three-dimensional shape is advantageous in the context of the present invention because the component can be placed on the three-dimensional shape as well. This reduces or avoids the formation of crinkles which would for example occur if the non-woven fabric was formed on a planar substrate and bent into a three-dimensional form. Furthermore, integrating the component into the non-woven fabric while it is formed on the three-dimensional shape is beneficial as the component may be rigid and can thus be made directly in its final three-dimensional shape, for example by injection molding. In such embodiments, no additional step of deforming the component from a two-dimensional shape to a three-dimensional shape is required.

The method may further comprise the steps of placing a component at least partially onto the first plurality of fibers transferred to the substrate and transferring a second plurality of fibers onto at least a portion of the component and onto at least a portion of the first plurality of fibers.

This allows to integrate the component directly into the non-woven fabric, thereby improving the fit and comfort of the final product. For example, the component may be rigid or semi rigid to provide, for example, stiffness and/or support to the non-woven fabric. For example, a heel counter and/or toe counter may directly be incorporated into a non-woven fabric for a shoe upper. The component may also be a soft component such as a foam or a non-woven pad.

It may be used, for example, in a shoe, as an additional padding for comfort and protection of the foot. An additional manufacturing step of joining the component to the non-woven fabric can be omitted which accelerates the manufacturing process and saves manufacturing costs. Furthermore, as the component is integrated inside the non-woven fabric, the component may not separate from the non-woven fabric. Consequently, the final product or article in which the non-woven fabric is to be used is much more durable. Also, the component can be integrated and attached to the non-woven layer without use of additional elements such as stitches or glue. It is therefore easier to create a single material product with a component made of the same material as the fibers of the non-woven. Such product is thus easier to recycle.

The varied pressure differential may help to maintain the component on the first layer (formed by the first plurality of fibers) before the second layer (formed by the second plurality of fibers) is applied.

It should be noted that according to the invention, the method step of applying the pressure differential can be performed at least partially while the first plurality of fibers is applied and/or at least partially while the second plurality of fibers is applied. For example, the pressure differential may be applied while the first plurality of fibers is applied, but not while the second plurality of fibers is applied. In another example, the pressure differential may be applied while the second plurality of fibers is applied, but not while the first plurality of fibers is applied. In a further example, the pressure differential may be applied while the first plurality of fibers is applied and while the second plurality of fibers is applied. In particular in some embodiments, the pressure differential may be applied while a component is placed on the first plurality of fibers and before the second plurality of fibers is applied so as to maintain the component in place on the substrate.

The component may have a three dimensional shape. This includes surfaces which extend in three dimensions. Thus, complex three-dimensional non-woven fabrics may be obtained. For example, the component may have the three-dimensional shape of a heel or toe counter or padding element.

The fiber transfer device may be a meltblown head. In a meltblown process molten filament emerge from a spinneret, are drawn by a primary air flow and broken into staple fibers by eddy currents. A secondary air flow transfers the fibers onto the substrate. Melt blowing is a very efficient process for producing non-woven fabrics. Thereby the non-woven is a meltblown non-woven.

The surface area of the component may be smaller than the surface area of the non-woven fabric and the component may be placed such that it is embedded in the non-woven fabric. Thus, the component is entirely enclosed by the fibers of the non-woven and held in place in all directions. Furthermore, it is protected by the fibers of the non-woven fabric against mechanical or chemical (including moisture) stress from the outside. This may in particular be advantageous if the component is an electronic component.

The component may comprise at least one appendix adapted to be surrounded by fibers. The appendix ensures that the component is fixed relative to the non-woven fabric and further avoids an unintended slipping of the component inside the non-woven fabric.

The component may comprise at least one opening such that fibers of the second plurality of fibers applied inside the opening are transferred onto the first plurality of fibers. For example, the component may comprise a loop-like structure. In this way, the component is firmly held in place at least by the fibers inside the opening.

The component may comprise such a shape that it is held in place by fibers. In particular, the component may comprise such a shape that it is held in place by fibers of the first plurality of fibers and/or the second plurality of fibers. This may, for example, be achieved by the appendix and/or the opening as described before.

The component may comprise a textured surface. In this way, the fibers coming into contact with the surface of the component will adhere better to the component.

At least one surface of the component may comprise a meltable layer. The meltable layer may face the first plurality of fibers or the second plurality of fibers. Thus, if for example a meltblown process is used to transfer the fibers onto the substrate, the fibers may melt or soften the meltable layer as they reach the surface of the component with a residual heat. This provides for a strong bond between the component and the fibers. Alternatively or additionally, at least one surface of the component may comprise an adhesive layer.

The melting temperature of the meltable layer may be below the temperature of the fibers when hitting the component. In this way, the heat of the fibers can be used to melt or soften the meltable layer. A further, additional heating of the meltable layer may therefore be omitted.

In general, the temperature of the transferred fibers is so that the transferred fibers are soft/molten enough when they hit the laid down fibers to stick to the laid down fibers.

The component may have a varying thickness. For example, the component may be a piece of foam or of non-woven, an air bubble or a pocket enclosing a fluid, such as, e.g., air. In this way, a cushioning or damping effect may be achieved.

The three-dimensional shape may be a last for a shoe or a portion thereof. Thus, the method may advantageously be used to manufacture a shoe upper or a portion thereof. The step of forming a two-dimensional non-woven fabric into a shoe upper shape may be omitted as the non-woven is formed in three-dimensional shape following the three-dimensional contour of the last. Such technique may provide a shoe upper with no seam, making it faster to produce and more comfortable.

The three-dimensional shape may be ball-shaped and the non-woven fabric may be suitable to be used as a layer of a ball or as a part thereof. Such layer or part may be for example a bladder, a carcass, a padding, a panel, an outer surface, etc. Thus, such layer or part of a ball may be manufactured in a single process and directly in a three-dimensional shape. The usual difficulties of forming a two-dimensional ball component into a three-dimensional ball-component such as, for example, assembly of multiple panels, are avoided.

The three-dimensional shape may be ball-shaped and the non-woven fabric may be suitable to be used as an outer surface of a ball. In this case, the method may further comprise the step of heating and compressing the non-woven fabric. Furthermore, the non-woven fabric may be textured. Such a texture may improve the aerodynamics and gripping properties of the final ball. A spray polyurethane (PU) may be applied on the non-woven fabric so as to form an outer layer with more abrasion resistance, less water intake, colors, etc.

The advantage of creating a ball or parts thereof with a non-woven technique as described herein is that the same characteristics may be obtained in every direction of the fabric. Also, for the manufacturing of a ball, the substrate may be hold by what will become the valve opening (since no non-woven can be applied where the support of the substrate connects with the substrate). In particular, the substrate may be a ball bladder. Another option is to roll a spherical substrate under the fiber transfer device in many different directions, so that every side is sprayed with non-woven.

The method may further comprise the step of feeding the fiber transfer device with a thermoplastic polyurethane (TPU) material. These materials are well suited for a meltblown process. TPU has a wide processing window making it easy to work with. TPU also has excellent mechanical properties such as high elasticity. TPU has good adhesion to itself due to a low crystallization temperature making formation of multiple layers easier. TPU is commonly used in shoe production e.g. for plates in football boots, soles, heel counters etc., making recycling of the complete shoe more simple. This material is also suitable for making components to be integrated in the non-woven such that a single material product may be produced. As these materials are also recyclable, the easiness of recycling of such product is improved. For example, the polypropylene material may be a medium melt viscosity polypropylene that is suitable for processing into a wide range of filament sizes and web structures.

The meltblown head may comprise a plurality of nozzles. In this way, the rate of blown fibers per time unit and the surface receiving meltblown fibers can be increased and overall process time may be reduced.

The method may further comprise the steps of feeding at least a first nozzle with a first material; and feeding at least a second nozzle with a second material, wherein the first material and the second material differ. By feeding nozzles with different materials a non-woven fabric with a mixture of fibers of different materials with possibly different properties (e.g. elasticity, color, diameter, etc.) may be formed. Depending on the relative movement between the meltblown head and the substrate, the two types of material may be mixed or may each form a portion of the non-woven fabric.

The method may further comprise the steps of transferring a first material for a first time duration; and transferring a second material for a second time duration, wherein the first material and the second material differ. In this way, a first layer of a first material may be created and then a second layer with a second material. Due to the different materials of the fibers, the layers may have different properties, yet they may be joined to each other without gluing, stitching or welding.

The method may further comprise the steps of transferring a first material onto a first portion of the shape; and transferring a second material onto a second portion of the shape, wherein the first material and the second material differ. Thus, the final non-woven fabric may be provided with different materials in different portions. For example, a shoe upper may comprise a more stiff material in the toe and heel area and a more elastic material in the remaining parts of the shoe upper. Thanks to the process according to the invention, the two portions may bond to each other without additional attaching means like gluing, stitching or welding. In particular, an integral, one-piece non-woven fabric may be obtained in this way and seams may be avoided.

The second material may be transferred with only a short delay after the first material such that the first material is still soft when the second material is applied to ensure a good bonding between the two materials. Alternatively or in combination, the temperature of the second material when it is applied may be set high enough to soften or melt the first material when the two materials come into contact with each other. For example, the temperature of the second material when it hits the first material may be about 60-70° C.

The method may further comprise the step of feeding at least one nozzle of the meltblown-head with a first material and a second material in a side-by-side configuration. In this way, multi-material fibers may be produced.

The first material may be a first TPU material and the second material may be a second TPU material, wherein the first TPU material has a different grade than the second TPU material. In this way, a very good bonding of the fibers can be achieved. At the same time, hardness and mechanical properties can be varied.

In general, the material used for forming the fibers may be chosen so as to have more or less stretch once set (i.e., cooled down). Thus, the stretch may be selected based on the desired application of the non-woven fabric. Furthermore, the invention allows creating thin flexible layers in one piece, even with complex shapes like a last, in particular a last including convex shapes. Indeed, although a last is rigid and inside the non-woven fabric, it may be removed easily out of the three-dimensional non-woven fabric even when the last displays one or more convex shape(s) because the non-woven fabric can stretch to allow the removal of the last, for example through an ankle opening of the shoe upper.

The method may further comprise the step of transferring at least a third plurality of fibers onto the substrate after the first plurality of fibers or after the second plurality of fibers, wherein the material of the third plurality of fibers differs from the material of the first plurality of fibers and/or of the second plurality of fibers. In this way, a multi-layered non-woven fabric may be obtained without the need to join the layers in a separate step. The third plurality of fibers may be transferred along the same direction as the first and/or second plurality of fibers or along a different direction.

The method may further comprise the step of moving the fiber transfer device relative to the substrate. In this way, the fibers may be applied to the substrate at different locations and/or at different distances and/or from different directions. This allows to manufacture a rather complex non-woven fabric, for example with a varying thickness. If the substrate is a three-dimensional shape, it is possible to distribute the fibers essentially uniformly by moving the fiber transfer device and the substrate accordingly. For example, it is possible to have the fibers hit the three-dimensional shape at a right angle on every portion of the substrate which would not be possible with a static arrangement of the three-dimensional shape and the fiber transfer device. "Movement" in the context of the present invention is understood as comprising translation, rotation and a combination of both. For example, the relative movement may be a linear translation only or may be a combination of a linear translation and small rotations. In particular, if rotations and translations are used, the rotations are beneficially at a higher frequency.

The invention also encompasses a method of manufacturing a non-woven fabric comprising a step of laying a higher proportion of fibers in a predetermined direction than in other directions. The relative movement of the fiber transfer device relative to the substrate may be used to lay a higher proportion of fibers in a predetermined direction than in other directions in order to create an anisotropic non-woven fabric. Such step may be combined or not combined with other steps of methods according to the invention. In particular, this may also be obtained without integrating a component as proposed by the present invention. In general, the higher the relative speed between the substrate and the fiber transfer device, the higher the proportion of oriented fibers.

The substrate may be placed on a robotic arm. In this way, a better distribution of the fibers may be provided. For example, the robotic arm may be moved to provide a uniform distribution of fibers. In another example, the robotic arm may follow a complex pattern, for example a combination of translations in different directions and rotations. To displace the substrate rather than the fiber transfer device is beneficial as it is usually more simple to displace the substrate in three dimensions than the fiber transfer device, since the latter needs at least one feed of fiber material. A robotic arm is also beneficial in case of some complex three-dimensional shapes such as a shoe last as it allows to rotate the three-dimensional shape at 360 degrees. The robotic arm also allows to control the distance between a surface of the substrate and the fiber transfer device in order to provide each area of the non-woven fabric with particular characteristics. Indeed the distance between the fiber transfer device and the surface may impact the structure and/or the thickness of the non-woven layer: The smaller the distance, the denser and/or thicker the non-woven layer. The robotic arm allows for example to maintain a constant distance between a surface of the substrate and the fiber transfer device, even with complex shapes such as a last, so that the characteristics of the non-woven layer is consistent across the whole shape.

Alternatively or additionally, the fiber transfer device may be placed on a robotic arm. In some beneficial embodiments however, the fiber transfer device is fixed. Indeed a fixed fiber transfer device is easier to maintain and cheaper than a movable fiber transfer device.

The method may further comprise the step of using an air stream to control the direction of fiber transfer. In this way, the application of the fibers can be controlled without the need to move the fiber transfer device of the substrate. For example with a meltblown head, a tertiary air stream may be used to control the direction of the fiber trajectories.

The method may further comprise the step of controlling the distance between the fiber transfer device and the substrate and/or controlling the speed of relative movement between the fiber transfer device and the substrate. In this way, the distribution of fibers across the three-dimensional shape can be controlled. A slower relative movement of the substrate and the fiber transfer device results in a thicker and in some embodiments denser deposition of fibers and vice versa.

The fiber diameter may be varied during the transfer of the fibers. Thus, the non-woven fabric may be provided with areas of different fiber diameters. The characteristics (such as density, breathability, etc.) of the non-woven fabric may therefore be locally varied.

Varying the fiber diameter may comprise using at least two different spinneret holes with different diameters. In this way, the fiber diameter may be varied across a broad range of diameters. Alternatively or additionally, varying the fiber diameter may comprise varying the air flow. Alternatively, or additionally, a first portion of fibers is transferred from a first meltblown head and a second plurality of fibers is transferred from a second meltblown head, wherein at least one nozzle of the first meltblown head comprises a smaller diameter than at least one nozzle of the second meltblown head. The fiber diameter influences the hand feel and mechanical properties of the non-woven fabric. For example, the non-woven fabric may have a stiff bottom section with thicker fibers and a more compliant top layer with finer fibers to give a better hand feel.

The distance and/or the speed may be varied during blowing the fibers onto the substrate. In this way, the non-woven fabric may be provided with a different thickness in different areas. For example, the non-woven may be thicker in a first area than in a second area.

In case of a three-dimensional shape, the shape may be concave and the method may further comprise the step of transferring the fibers onto an inner surface of the three-dimensional shape. The three-dimensional shape may be a shoe cavity such as a shoe mold (like a negative last) or an upper layer created with a method according to the invention or with any other available method (such as knitting, weaving, molding, etc.). Thereby an inner layer of a shoe upper may be created of a non-woven fabric, which may provide a particularly good fit. The inner layer forms e.g. an inner sock and/or a padding.

The first layer and the non-woven layer may each ensure a different function. For example the first layer may ensure waterproofing or support of the foot in certain areas, while the non-woven layer may be an inner sock ensuring comfort. Such feature also allows creating a shoe upper of a single material (e.g., TPU) by combining a layer or component of a given material and a non-woven component or layer of the same material. Thereby recycling of the shoe is facilitated.

In general, the method according to the invention allows to create a non-woven, three-dimensional sock, whether by blowing fibers onto a last or in a shoe cavity, which therefore also comprises a bottom portion, i.e., a portion under the foot. Such technique may also allow the formation of a non-woven fabric on the three-dimensional shape in some areas only so as to create a padding, in some embodiments a padding of the same material as the rest of the shoe. Also, the formation of a non-woven fabric in layers may allow obtaining an isotropic layer or an anisotropic layer. An anisotropic layer may be obtained by laying a higher proportion of fibers in a predetermined direction than in other directions. This may, for example, be achieved by moving the fiber transfer device relative to the substrate in the predetermined direction.

The method may further comprise the steps of covering the substrate at least partly with a base layer; and transferring at least a portion of the first plurality of fibers and/or of the second plurality of fibers onto the base layer. Thus, the non-woven fabric may directly be bonded to a base layer without an additional joining step. For example, a non-woven fabric for a shoe upper may be directly formed on a water-repellant membrane. The base layer may, for example, be a textile such as a woven or knitted fabric. Alternatively, the base layer may be for example a leather or a non-woven.

The method may further comprise the step of transferring the first plurality of fibers and/or the second plurality of fibers onto a first area of the substrate, but not onto a second area. This allows to form a non-woven fabric with the desired dimension without the need for cutting. For example, a non-woven fabric for a shoe upper may be formed by only transferring fibers onto an upper surface of a last, but not onto a lower surface. In another example, if the non-woven fabric is intended for a rear portion of a shoe upper, fibers may be transferred to a rear portion of a last, but not to a front portion. Thanks to the invention, it is possible to directly integrate a heel counter in the heel portion of the shoe upper.

Alternatively, or additionally, the method may comprise the step of varying the duration of application of fibers. For example, fibers may be first applied in only a first area, then in only a second area. In another example, fibers are first applied almost everywhere to the substrate and/or component and then only to a second area (or vice-versa).

The holes may also be provided by the loops of a mesh or the pores of a porous material. For example, the substrate may be a porous last. A substrate with hole may be obtained by additive manufacturing, such as 3D-printing.

The strength of the pressure differential may be varied across the surface of the substrate to locally vary the thickness of the non-woven fabric. In this way, a more complex non-woven fabric with varying thickness may be obtained. For example, the non-woven fabric for a shoe upper may be thicker in the area of the heel to provide for some padding in this area.

The three-dimensional shape may be textured. In this way, the non-woven fabric may easily be provided with a textured surface. For example, a non-woven fabric for a shoe upper for a soccer shoe may be provided with a texture to increase the grip with a soccer ball.

The texture applied to the non-woven fabric may be controlled by selecting the structure and/or the porosity of the surface of the substrate. If a pressure differential is applied as described above, the texture can also be controlled by the strength of the pressure differential.

The method may further comprise the step of placing a removable membrane over the non-woven fabric while it is located on the three-dimensional shape. This is in particular advantageous in combination with applying a pressure differential by the substrate as it allows to compact the non-woven fabric even more.

The method may further comprise the step of applying a pressure differential after the removable membrane has been placed. In this way the non-woven fabric can be consolidated. Furthermore, if a textured membrane is used, the non-woven fabric can be provided with a surface texturing.

The membrane may be textured. In this way the non-woven fabric may be provided with a textured upper surface (i.e., the surface pointing away from the substrate) as well. In combination with a textured substrate, it is possible to provide the non-woven fabric with a texture on both of its sides.

The method may further comprise the step of applying pressure and/or heat to the non-woven fabric. In particular, the method may further comprise the step of applying pressure and/or heat to the non-woven fabric while it is located on the three-dimensional shape. This step may, for example, be performed while the membrane is placed over the non-woven fabric. In this way, the surface of the non-woven fabric may be consolidated and or finished. In particular it may be textured and/or compacted. Applying heat will also improve abrasion resistance and other mechanical properties such as tensile strength and tear strength. Pressure and/or heat may be applied locally only, i.e., to only certain areas of the non-woven fabric.

In some embodiments, pressure and/or heat may be applied to the non-woven locally in order to modify locally the properties of the non-woven. It may, for example, allow creating some reinforcements locally.

On a two-dimensional non-woven fabric at least, heat and/or pressure may be applied through calendaring.

In general, the curing of the outer surface of the non-woven fabric (by application of heat and/or pressure) may permit to create a layer that is firmer, with less water intake, better abrasion resistance, etc. Also, a design may be imprinted on the outside of the non-woven fabric by application of heat and/or pressure.

A further aspect of the present invention relates to a non-woven fabric manufactured according to a method as described above.

A further aspect of the present invention is directed to a method of manufacturing a shoe upper. The method comprises the step of manufacturing a first non-woven fabric according to a method as described before, wherein the first non-woven fabric is a part of the shoe upper.

The method of manufacturing a shoe upper may further comprise the steps of manufacturing a second non-woven fabric according a method as described before, wherein the second non-woven fabric is a part of the shoe upper; and joining the first non-woven fabric and the second non-woven fabric. For example, different portions of a shoe upper may be created in the form of shoe upper components with a three-dimensional shape, and then assembled together, for example by the application of heat (e.g. welding), or glue, etc. Such a component may also be assembled to layers or components of different nature. For example to components made of different materials, and/or components made through different methods of manufacturing (e.g. by knitting or weaving).

A further aspect of the present invention relates to a shoe upper manufactured according to a method as described before.

A still further aspect of the present invention relates to a method of manufacturing a non-woven fabric, comprising the steps of (a.) providing a substrate; (b.) providing a meltblown head adapted to transfer fibers onto the substrate; (c.) feeding at least a first nozzle of the meltblown head with a first material; (d.) feeding at least a second nozzle of the meltblown head with a second material, wherein the first material and the second material differ; and (e.) transferring the first material and the second material onto the substrate. By feeding nozzles with different materials a non-woven fabric with a mixture of fibers of different materials with possibly different properties (e.g. elasticity, color, diameter, etc.) may be formed. Depending on the relative movement between the meltblown head and the substrate, the two types of material may be mixed or may each form a portion of the non-woven layer.

The method may further comprise the steps of transferring the first material for a first time duration; and transferring the second material for a second time duration, wherein the first material and the second material differ. In this way, a first layer of a first material may be created and then a second layer with a second material. Due to the different materials of the fibers, the layers may have different properties, yet they may be joined to each other without gluing, stitching or welding.

The method may further comprise the steps of transferring the first material onto a first portion of the shape; and transferring the second material onto a second portion of the shape, wherein the first material and the second material differ. Thus, the final non-woven fabric may be provided with different materials in different portions. For example, a shoe upper may comprise a more stiff material in the toe and heel area and a more elastic material in the remaining parts of the shoe upper. Thanks to the process according to the invention, the two portions may bond to each other without additional attaching means like gluing, stitching or welding. In particular, an integral, one-piece non-woven fabric may be obtained in this way and seams may be avoided.

The second material may be transferred with only a short delay after the first material such that the first material is still soft when the second material is applied to ensure a good bonding between the two materials. Alternatively, or in combination, the temperature of the second material when it is applied may be set high enough to soften or melt the first material when the two materials come into contact with each other. For example, the temperature of the second material when it hits the first material may be about 60-70° C.

The first material may be a first TPU material and the second material may be a second TPU material, wherein the first TPU material has a different grade than the second TPU material. In this way, a very good bonding of the fibers can be achieved. At the same time, hardness and mechanical properties can be varied.

A still further aspect of the present invention relates to a method of manufacturing a non-woven fabric, comprising the steps of (a.) providing a substrate; (b.) providing a meltblown head adapted to transfer fibers onto the substrate; (c.) feeding at least one nozzle of the meltblown head with a first material and a second material in a side-by-side configuration; and (d.) transferring the first material and the second material onto the substrate. In this way, multi-material fibers may be produced.

The first material may be a first TPU material and the second material may be a second TPU material, wherein the first TPU material has a different grade than the second TPU material. In this way, a very good bonding of the fibers can be achieved. At the same time, hardness and mechanical properties can be varied.

A still further aspect of the present invention relates to a method of manufacturing a non-woven fabric, comprising the steps of (a.) providing a substrate; (b.) providing a fiber transfer device adapted to transfer fibers onto the substrate; (c.) transferring fibers onto the substrate by means of the fiber transfer device; and (d.) controlling the distance between the fiber transfer device and the substrate and/or controlling the speed of relative movement between the fiber transfer device and the substrate. In this way, the distribution of fibers across the three-dimensional shape can be controlled. A slower relative movement of the substrate and the fiber transfer device results in a thicker and in some embodiments denser deposition of fibers and vice versa.

Controlling the distance between the fiber transfer device and the substrate and/or controlling the speed of relative movement between the fiber transfer device and the substrate, may be obtained by mounting the fiber transfer device and/or the substrate on a robotic device such as a robotic arm, of which the path is predetermined and/or controlled. The relative movements of the fiber transfer device and the substrate may in particular be controlled by a computer program.

The fiber diameter may be varied during the transfer of the fibers. Thus, the non-woven fabric may be provided with areas of different fiber diameters. The characteristics (such as density, breathability, etc.) of the non-woven fabric may therefore be locally varied.

Varying the fiber diameter may comprise using at least two different spinneret holes with different diameters. In this way, the fiber diameter may be varied across a broad range of diameters. Alternatively, or additionally, varying the fiber diameter may comprise varying the air flow. Alternatively, or additionally, a first portion of fibers is transferred from a first fiber transfer device and a second plurality of fibers is transferred from a second fiber transfer device, wherein the first portion of fibers comprises a smaller average diameter than the second portion of fibers. The fiber diameter influences the hand feel and mechanical properties of the non-woven fabric. For example, the non-woven fabric may have a stiff bottom section with thicker fibers and a more compliant top layer with finer fibers to give a better hand feel.

In case of a three-dimensional shape, the shape may be concave and the method may further comprise the step of transferring the fibers onto an inner surface of the three-dimensional shape. The three-dimensional shape may be a shoe cavity such as a shoe mold (like a negative last) or an upper layer created with a method according to the invention or with any other available method (such as knitting, weaving, molding, etc.). Thereby an inner layer of a shoe upper may be created of a non-woven fabric, which may provide a particularly good fit. The first layer and the non-woven layer may each ensure a different function. For example, the first layer may ensure waterproofing or support of the foot in certain areas, while the non-woven layer may be an inner sock ensuring comfort. Such feature also allows creating a shoe upper of a single material (e.g., TPU) by combining a layer or component of a given material and a non-woven component or layer of the same material. Thereby recycling of the shoe is facilitated.

According to all aspects of the present invention described herein, the non-woven fabric may be used as a first layer of a sound insulation structure for a garment. The sound insulation structure may comprise at least a first layer comprising a sound absorbing material and at least a second layer adapted to be either sound reflecting, sound diffusing or both. In particular, the size and density of the fibers of the non-woven fabric may be chosen to obtain a high sound absorption in a targeted range of frequencies.

The second layer may be obtained by a post-processing of one face of the non-woven first layer, for example by application of heat and/or pressure. The second layer may also be obtained by applying heat and/or pressure to the non-woven fabric and then be combined to the first layer.

The substrate on which the non-woven fabric is formed may be a three-dimensional shape as described above. Thereby, the non-woven layer may be directly formed in a three dimensional shape of the final product. Thus, no additional forming of the non-woven fabric is required as it is directly made to its useful shape. The three-dimensional shape may, for example, be a shape of a head or of a hood, of a pocket, etc.

The substrate may have a texture. The non-woven layer thereby adopts a negative texture on its face in contact with the substrate. Such texture may enhance comfort and/or sound diffusion.

The substrate may comprise a plurality of holes in at least a portion of its surface and the method may further comprise the step of applying a pressure differential to the plurality of holes, so that the fibers transferred onto the substrate are attracted by the pressure differential. This allows to compact the fibers together to obtain a more dense non-woven fabric. In some embodiments, it may also allow to create a texture on the surface so as to improve its sound diffusion, sound absorption and/or comfort: in particular with a substrate having the shape of a wide array in which the fibers are pulled in the holes of the array so as to form padded humps on the inner surface of the non-woven fabric.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

In the following, embodiments and variations of the present invention are described in more detail.

FIG. 1 illustrates an example of how fibers 11 can be transferred onto a substrate 12 to form a non-woven fabric 13. The process schematically depicted in FIG. 1 is a meltblown process. However, in general, in the context of the present invention, any technique by which fibers can be transferred onto the substrate 12 can be used. An example for such an alternative technique is the usage of electrostatic forces, i.e. an electrical field applied between a fiber transfer device, like the one shown in FIG. 1 with the reference numeral 14, and the substrate 12.

In the meltblown process depicted in FIG. 1, a resin 15 is fed into a spinneret 16. An example for an easy to process resin suitable for producing a range of different non-woven structures is a polypropylene homopolymer. In general, in the context of the present invention, any material suitable to be used in a meltblown process may be used. An example for such a material is TPU.

The resin 15 is heated in the spinneret 16 to a temperature above its melting temperature. The spinneret 16 comprises an opening with a small diameter such as between 15 and 30 microns, thus forming a nozzle 17. The molten resin 15 is drawn by a primary air flow 18 out of the nozzle 17 as filaments. Eddy currents break up the filaments into fibers 11 of a certain length called staple fibers. A secondary air flow 19 transfers the fibers 11 onto the substrate 12. Thus, the air flow causes the fibers to fall like an inverse tornado, they circle with the eddy (rotating) currents in the air with the diameter of the circles getting wider towards the target In this way, the non-woven fabric 13 is formed as a random array of fibers.

The fibers 11 thus produced may have a diameter of 1 μm to 100 μm, preferably between 5 μm and 50 μm, more preferably at about 10 μm and 30 μm.

It should be noted that the fiber transfer device 14 may comprise a plurality of such nozzles 17 to increase the production rate of fibers 11. It is also possible to feed a first portion of a plurality of nozzles 17 with a first material and a second portion of nozzles 17 with a second material, wherein the first material and the second material differ. To this end, different resins 15 may be used. In this way, different types of fibers may be transferred onto the substrate 12. Those fibers may mix when transferred or they may hit the substrate 12 at different locations so that areas with different materials are formed on the substrate 12.

To form areas of the non-woven fabric 13 with different materials, it is also possible to first transfer fibers 11 of a first material onto the substrate, move the substrate 12 relative to the fiber transfer device as will be described in more detail below and then to apply fibers 11 of a second, different material onto the substrate. This may be achieved by exchanging the resin 15 or by using different nozzles 17 fed by different resins 15.

It is also possible to feed a nozzle, such as nozzle 17, with two different materials in a side-by-side configuration or as a mixture to obtain two-component fibers. To this end, the fiber transfer device 14 may comprise two reservoirs for two different resins 15.

In the example of FIG. 1, the substrate 12 is shown as having a hemispherical three-dimensional shape. In general, in the context of the present invention, the substrate may have an arbitrary three-dimensional shape and may comprise convex and/or concave surfaces. Advantageously, the three-dimensional shape of the substrate 12 is adapted to the shape of the final non-woven fabric as it is used in an article. For example, the hemispherical shape in FIG. 1 results in a hemispherical non-woven fabric 13. Such a hemispherical non-woven fabric 13 may, for example, be used as a bladder, carcass or a padding for a ball or a part thereof.

While the substrate 12 in FIG. 1 is shown to be convex, it may also have a concave shape, for example a hollow hemisphere. In this case, fibers 11 may be transferred to an inner surface of the hollow hemisphere. In another example, the substrate 12 may be a last. Accordingly, the non-woven fabric 13 formed on the last may have the shape of a shoe upper, a shoe sole or a part thereof. It should be noted that in the context of the present invention, the substrate 12 may have a two-dimensional shape as well, i.e., it may be planar.

As indicated by the arrows 110, the substrate 12 may be moved relative to the fiber transfer device 14. This may be accomplished by either moving the substrate 12 and holding the fiber transfer device 14 in place or vice versa. It is also possible to move both, the substrate 12 and the fiber transfer device 14. As indicated by the arrows 110, the substrate 12 is moved along a linear trajectory under the fiber transfer device 14. Thus, fibers are first transferred to the peripheral area of the substrate 12 on the right side of the hemisphere, then to the center of the hemisphere and finally to the peripheral area on the left side of the hemisphere. If the direction of fiber transfer is held constant during the movement of the substrate 12, more fibers will be deposited on the top of the hemisphere than on the sides of the hemisphere. Accordingly, the resulting non-woven fabric 13 will be thicker at the top.

The substrate 12 may perform more complex movements as indicated by the arrows 111. For example, the substrate may be rotated around a vertical direction and/or a horizontal direction. In the context of the present invention, a "movement" is understood as comprising translation(s), rotation(s) or a combination of translation(s) and rotation(s). A rotation may be performed along an arbitrary direction in space and a movement may be along an arbitrary trajectory in space.

Complex movements may be achieved by mounting the substrate 12 on a robotic arm (not shown in the figures). For example, the robotic arm may be moved to provide a uniform distribution of fibers 11. In another example, the robotic arm may follow a complex pattern, for example a combination of translations in different directions and rotations around one or more axis. A robotic arm is very advantageous in case of some specific three-dimensional shapes such as a shoe last as it allows to rotate the three-dimensional shape at 360 degrees. The robotic arm also allows to control the distance 112 between a surface of the substrate 12 and the fiber transfer device 14 in order to provide each area of the non-woven fabric 13 with particular characteristics. Indeed the distance 112 between the fiber transfer device 14 and the surface may impact some characteristics such as the structure and/or the thickness of the non-woven layer 13. The robotic arm allows for example to maintain a constant distance between a surface of the substrate 12 and the fiber transfer device 14, so that the characteristics of the non-woven layer 13 is consistent across the whole shape, even in case of a complex substrate shape. Alternatively or additionally, the speed of movement of the robotic arm may be controlled and varied while fibers 11 are transferred onto the substrate 12.

Alternatively or additionally, the meltblown head may be placed on a robotic arm. In this case, the same considerations as above apply.

Instead of applying the fibers 11 directly onto the substrate 12, it is also possible to place a base layer (not shown in the figures) on the substrate 12 and to transfer the fibers onto the base layer. The fibers 11 may bond to the base layer. Such a base layer may, for example, be a non-woven, woven or knitted fabric. The material of the base layer may be the same as the material of the fibers 11 to facilitate bonding of the fibers 11 to the base layer.

The fibers 11 may also not be applied to the entire substrate 12. For example, a non-woven fabric 13 for a shoe upper may be formed by only transferring fibers onto an upper surface of a last, but not onto a lower surface. In another example, if the non-woven fabric is intended for a rear portion of a shoe upper, fibers 11 may be transferred to a rear portion of a last, but not to a front portion. A partial application of fibers 11 onto the substrate 12 may, for example, be achieved by mounting the substrate 12 or the fiber transfer device 14 or both on a robotic arm as described above.

As indicated by arrows 113 in FIG. 1, a pressure differential is applied to the substrate 12. In general, the substrate 12 is air permeable in at least a portion of its surface. To this end, the substrate 12 in the exemplary embodiment of FIG. 1 comprises a plurality of holes, three of which are exemplarily denoted by the reference numeral 114 in FIG. 1. The pressure differential causes the fibers 11 blown onto the three-dimensional shape 12 to be attracted by the pressure differential. Thus, the fibers 11 are compacted together to obtain a more dense non-woven fabric 13. The pressure differential may be generated by a vacuum source, pump, or similar device connected to the substrate 12 such that a flow of air is generated through the holes 114 as indicated by the arrows 113. In this way, a suction is generated.

According to the invention, the strength of the pressure differential is varied across the surface of the substrate 12. Varying the strength of the pressure differential across the surface of the substrate 12 may allow to locally vary properties, such as e.g., the thickness, of the non-woven fabric 13. For example, the non-woven fabric 13 for a shoe upper may be thicker in the area of the heel to provide for some padding in this area. The variation of the pressure differential may be achieved by varying the size and/or shape and/or density of the holes 114 across the surface of the substrate 12. The substrate may comprise some areas deprived of holes, and other areas with holes 114. In particular some areas may comprise hole arrays.

Figure 4A:
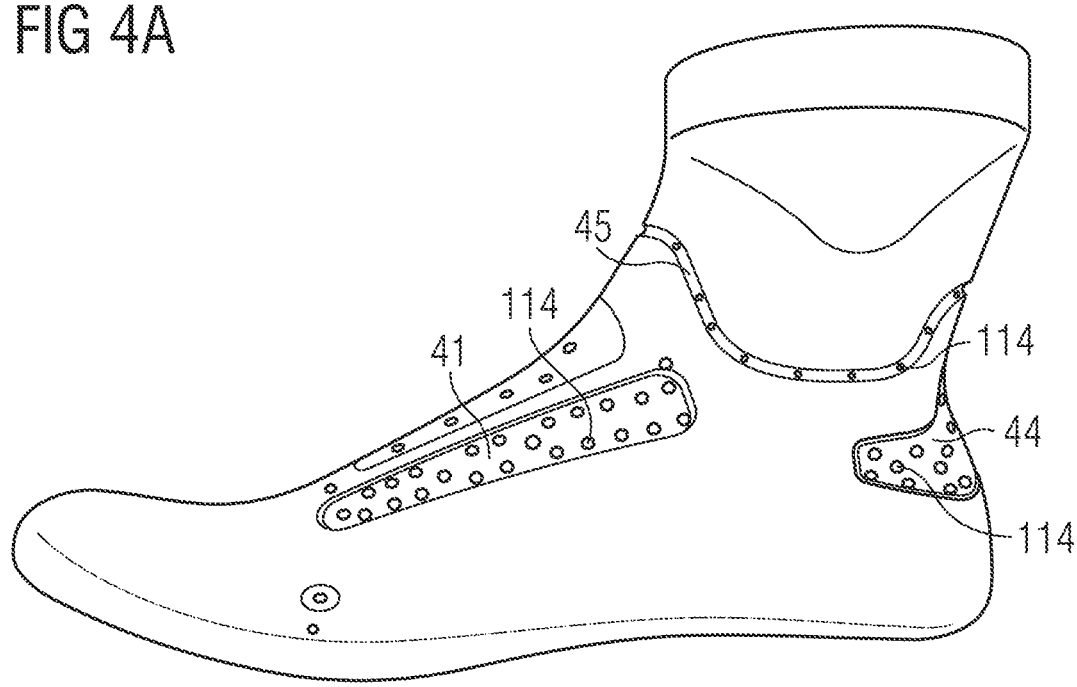
FIG. 4A illustrates an arrangement of holes on a substrate according to an embodiment of the present invention.
Figure 4B:
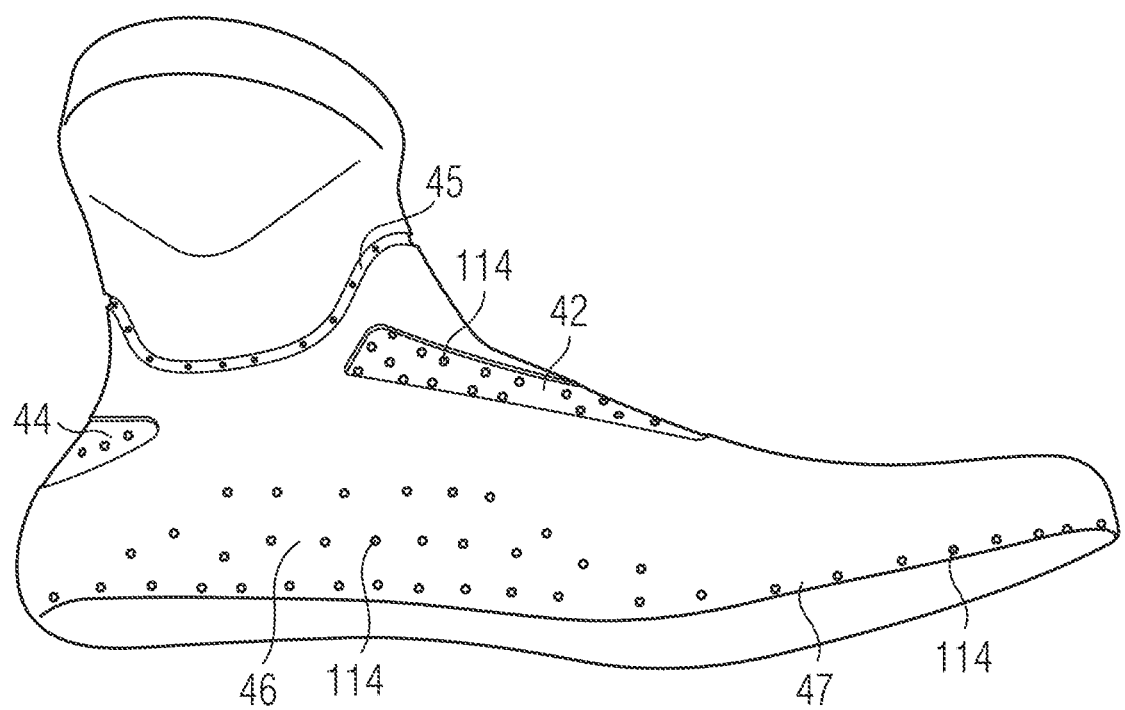
FIG. 4B illustrates another arrangement of holes on the substrate of FIG. 4A according to an embodiment of the present invention.

An example of varying the arrangement of holes on a substrate 12 is shown in FIGS. 4A, 4B and 4C. These figures show a substrate 12 in the shape of a last. The last 12 comprises different zones with holes of which some are exemplarily denoted by the reference numeral 114. A first zone 41 is arranged on a lateral instep portion of the last 12. A second zone 42 is arranged on the medial instep portion of the last 12. A third zone 43 is arranged on a central instep portion of the last 12. A fourth zone 44 is arranged on a heel portion of the last 12. A fifth zone 45 is arranged on the collar portion of the last 12. A sixth zone 46 is arranged at the lower medial mid-foot portion of the last 12. A seventh zone 47 is arranged on a lower medial side of a forefoot portion of the last 12. Thus, by applying a pressure differential across the holes in the different zones 41 to 45, the fibers are made to conform to the shape of the last 12. In particular the zone 46 the fibers conform to the concave shape of the last 12 instead of bridging over this concave zone. Besides, where the holes are placed in a recess such as in the zones 41, 42, 43, 44 the thickness of the non-woven fabric can be increased as compared to the areas of the last 12 not having any holes, so as to form some padded zones.

In other embodiments, the holes 114 are arranged in zones and different vacuum sources or pumps with different strengths are connected to the various zones. It is of course also possible that the substrate 12 comprises holes 114 in only a specific area, but not in another area as described with respect to FIGS. 4A-C. For example on the embodiment of FIGS. 4A-C the upper forefoot area does not have any hole such that it is not permeable to air.

Also, the holes 114 may be placed in concave portions 41, 42, 43, 44 (or recesses) of the substrate 12. Placing holes in concave portions of the substrate may allow ensuring that the fibers are attracted into this concave portion and do not bridge over the concave portion. Placing holes in the concave portions of the substrate thereby allows creating some padded zones. As can be seen on the examples of FIGS. 4A-C, on a shoe last 12 such concave portions have been created in the heel area 44 and in the tongue area 43 to provide padding in these areas. On the other hand, holes have been placed in the concave portion of the lower mid-foot 46 in order to ensure that the shape of the non-woven layer conforms to the shape of the last 12. Also holes have been place in the lower forefoot area 47 in order to ensure that the fibers conform to the shape of the last 12 along a line of small internal angle.

The substrate may comprise holes along lines corresponding to the edge of the finished product like for example the collar zone 45 in the example of FIGS. 4A-C. Indeed, this allows obtaining a denser configuration of the non-woven material along these lines, thereby providing a cleaner edge on the final product after the non-woven fabric is cut along such line.

Besides the size and/or shape and/or density of the holes in the substrate may be selected so as to provide a texture to the non-woven fabric. Such texture may be used to provide comfort to the user, or a tactile feedback for example. Also, in a method according to the invention, the non-woven fabric may be turned inside out after application on the substrate such that the inside face that was in contact with the substrate during fibers application on the substrate becomes the outer face of the non-woven fabric. This may be used to create some aesthetic effects, or to improve grip for example. In particular, the texture of the substrate may thus be transferred as negative texture of the outer surface of the final product, e.g., of a shoe upper.

The substrate may be created by additive manufacturing. This may allow obtaining complex shapes of the substrate. Such technique may also allow creating holes with very small diameters, for example of less than 1 mm, in particular less than 0.5 mm, for example between 0.1 mm and 0.5 mm.

To provide the non-woven fabric 13 with a textured surface, it is possible to use a substrate 12 with a surface texturing (not shown in FIG. 1). The texture of the substrate 12 will be transferred to the non-woven fabric 13 as a negative. This effect can be amplified by using a pressure differential as explained above.

The effect of the pressure differential to compact the fibers may be amplified by placing a removable membrane (not shown in FIG. 1) over the non-woven fabric 13 while it is located on the three-dimensional shape 12. If the membrane is impermeable or at least partially impermeable to air or gas, the membrane will be sucked onto the non-woven fabric 13 and will compact the fibers 11. Additionally, heat can be applied to the membrane, for example by an infrared radiator or another suitable heat source. The heat is transferred by the membrane to the non-woven fabric 13 to consolidate the fibers 11 by melting or softening the fibers 11 at least partially. Application of heat can strengthen the bonds between individual fibers 11 and can help to maintain the non-woven fabric in a compacted state. An example of a suitable material for the membrane is silicone.

According to the method of the invention, a first plurality of fibers 11 is transferred to the substrate 12 as explained above. Then, a component (not shown in FIG. 1) is placed onto the first plurality of fibers 11 transferred to the substrate 12. Subsequently, a second plurality of fibers 11 is transferred onto at least a portion of the component and onto at least a portion of the first plurality of fibers 11. The transfer of fibers 11 may be interrupted while placing the component onto the first plurality of fiber 11 and after the component has been placed, the transfer of fibers 11 may continue. Alternatively, the transfer of fibers 11 is not interrupted and the component is placed while fibers 11 are transferred onto the substrate 12, the first plurality of fibers and/or the component.

Figure 2B:
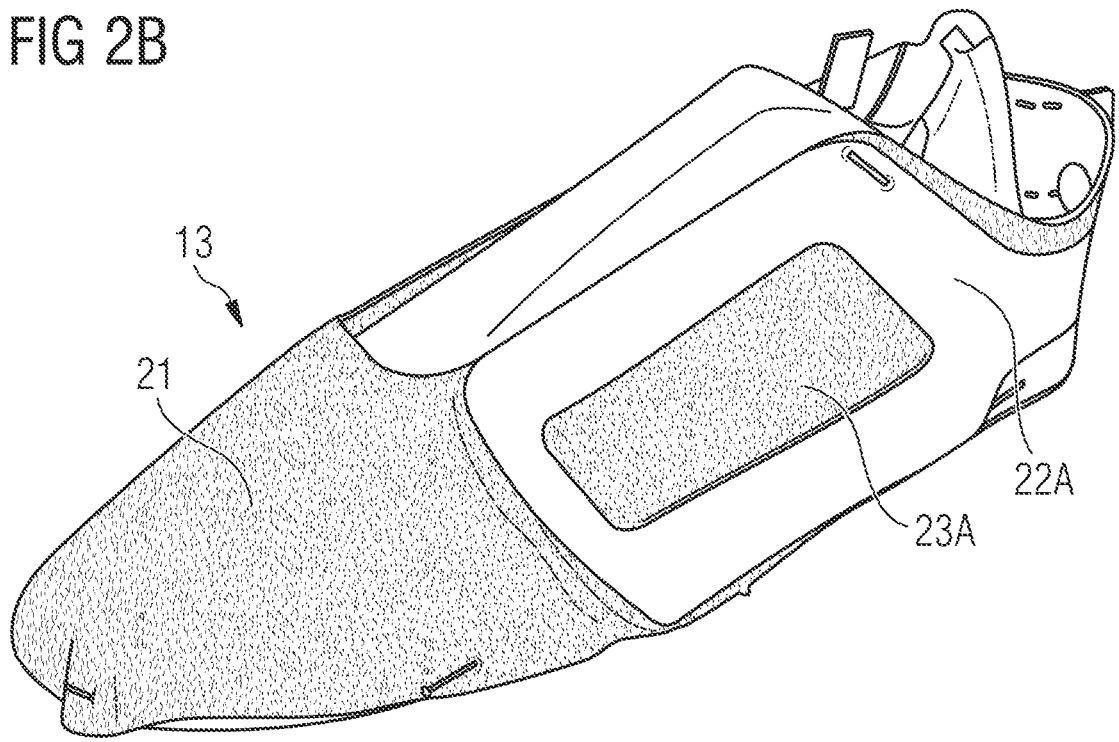
FIG. 2B illustrates the portion of the non-woven fabric of FIG. 2A in a three-dimensional configuration.

The component may, for example, be a reinforcement with the function of locally lowering the stretch of the non-woven fabric as will be shown in more detail with reference to FIGS. 2A and 2B. It may also be a padding, cushioning, electronic component, membrane (e.g., waterproof membrane), etc.

The component may be placed manually or may be placed by a robotic arm (not shown in FIG. 1). In both cases, the component may be taken from a stack comprising a plurality of similar components.

The number of components placed on the first plurality of fibers is arbitrary and may at least be one. Thus, it is also possible to place two, three or more components on the first plurality of fibers and to subsequently transfer fibers 11 to one or more of those placed components. The components may partly or entirely overlap or may be separate from each other. According to the invention it is also possible to place one or more first components onto the first plurality of fibers 11, transfer a second plurality of fibers 11 onto the first plurality of fibers 11 and the one or more first components, place one or more second components on the second plurality of fibers 11 and/or the one or more first components and transfer a third plurality of fibers 11 onto the first plurality of fibers 11 and/or the second plurality of fibers 11 and/or first one or more components and/or second one or more components. Thus, it is possible to embed or "sandwich" components at different heights in the thickness of the non-woven fabric 13.

The non-woven fabric 13 may also be subject to certain post-processing or finishing steps. For example, heat and/or pressure may be applied to modify the characteristics of the non-woven fabric. To do so, different techniques may be used, including passing the non-woven fabric between two cylinders of a calendar. In particular, application of pressure and heat has the effect of densifying the material locally, thereby modifying at least the thickness and/or the stretchability. Also, transparency may be obtained through this process in order to obtain visually attractive designs.

A spray may be applied to the non-woven fabric 13. For example a polyurethane (PU) spray may be applied that would locally modify the characteristics of the non-woven fabric 13. The spray may alternatively or in combination be of a specific color to enhance the visual aspect of the non-woven fabric 13. The spray may in particular soak in the non-woven so as to modify its characteristics, in particular its mechanical characteristics.

FIGS. 2A and 2B show an exemplary non-woven fabric 13. The non-woven fabric 13 in the example of FIGS. 2A and 2B has the shape of a shoe upper. In FIG. 2A the part of the non-woven fabric 13 is shown in a planar, two-dimensional configuration, whereas in FIG. 2B it is shown in a three-dimensional configuration. The non-woven fabric 13 comprises a first plurality 21 of fibers which have been transferred to a planar substrate (not shown in FIGS. 2A and 2B) as described above with respect to FIG. 1. Two components 22A and 22B are placed on the first plurality 21 of fibers and the second plurality of fibers has been transferred onto the first plurality 21 of fibers and the components 22A and 22B as described above. The two components 22A and 22B are still visible through the second plurality of fibers.

In the example of FIGS. 2A and 2B the components 22A and 22B are reinforcements of the shoe upper which are located on the medial and lateral sides of the shoe upper, respectively. The components in the example of FIGS. 2A and 2B are made of TPU. For example, a compact TPU material can be used which ensures a good bonding to the TPU fibers and comprises better recycling properties.

In the example of FIGS. 2A and 2B the components 22A and 22B each comprise an opening 23A and 23B, respectively. When the second plurality of fibers 11 is transferred to the non-woven fabric 23, fibers 11 will be arranged inside the openings 23A and 23B. The fibers of the first plurality 21 of fibers and the second plurality of fibers are bond to each other inside the openings 23A and 23B, but also outside of the components 22A and 22B, respectively. In this way, the components 22A and 22B are firmly held in place by the fibers. It should be noted that the component in the context of the present invention may comprise an arbitrary number of openings or may comprise no opening at all.

Additionally or alternatively, the components 22A and 22B may comprise at least one appendix (not shown in the figures) adapted to be surrounded by fibers 11. Such an appendix could have the shape of an anchor or simply be a linear extension. The appendix ensures that the component is fixed inside the non-woven and further avoids an unintended slipping of the component. In general, the component placed on the first plurality 21 of fibers may comprise such a shape that it is held in place by fibers. To this end, the component may comprise a textured surface (not shown in the figures). In this way, the fibers coming into contact with the surface of the component will adhere better to the component.

In the example of FIGS. 2A and 2B the components 23A and 23B extend until the edges of the shoe upper. Thus, when viewed from a side, the edge of the finished non-woven fabric 13 will show the components 23A and 23B "sandwiched" between the first plurality 21 of fibers and the second plurality of fibers. However, it is also possible that the components 23A and 23B are smaller than the shape of the shoe upper and, thus, are entirely embedded inside the non-woven fabric 13. In this case, the components 23A and 23B may not be visible at all, not even at the edge of the non-woven fabric 13, depending on the non-woven material, color and thickness.

It is also possible that the at least one surface of the component comprises a meltable layer. The meltable layer may face the first plurality 21 of fibers or the second plurality of fibers. Thus, if for example a meltblown process as described above is used to transfer the fibers onto the substrate 12, the hot fibers may melt or soften the meltable layer and may bond to the meltable layer. Alternatively, the component may comprise an adhesive which adheres to the fibers 11 without the application of heat. Adhesives or meltable layers may be applied to both sides of a component such that the component adheres to both the first 21 plurality of fibers and the second plurality of fibers.

The non-woven fabric 13 shown in FIGS. 2A and 2B has been subject to a heat and pressure treatment in the heel area making the non-woven layer 21 more translucent.

Figure 3A:
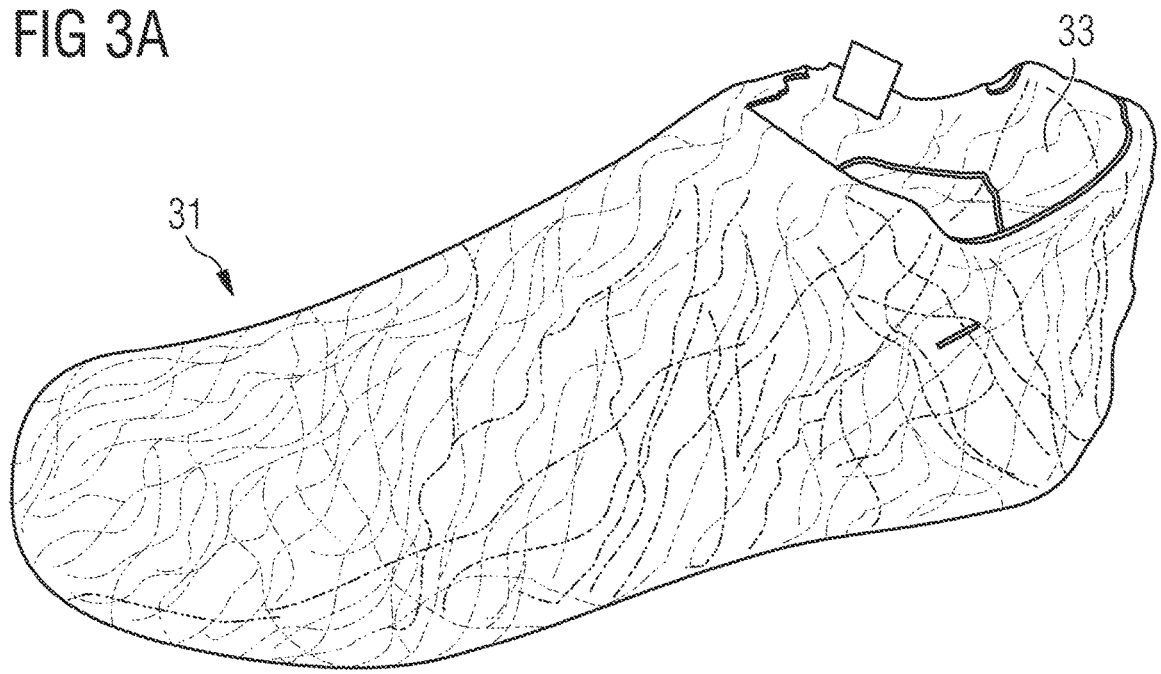
FIG. 3A illustrates a portion of a non-woven fabric obtained according to a method of the present invention according to an embodiment of the present invention in a three-dimensional configuration.
Figure 3B:
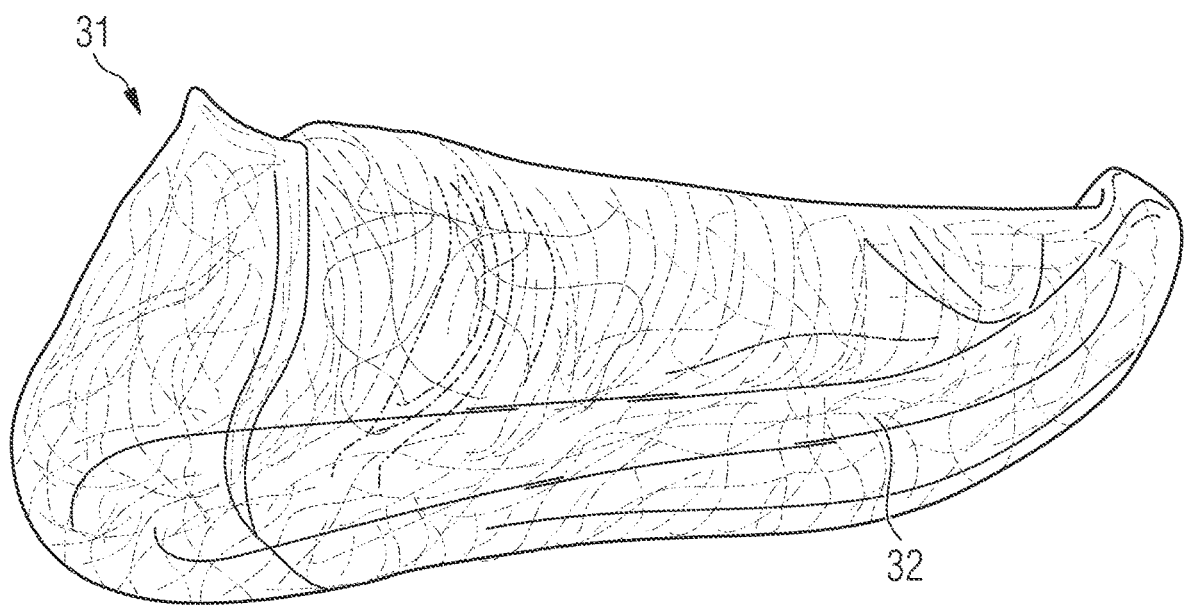
FIG. 3B illustrates another view of the non-woven fabric in the three-dimensional configuration.

FIGS. 3A and 3B show an exemplary non-woven fabric in the shape of a sock-like shoe upper 31 which has been obtained by the method according to the invention as described above. As can best be seen in FIG. 3B, the shoe upper 31 comprises a bottom side 32 facing a sole of a shoe (not shown in FIGS. 3A and 3B). Thus, the shoe upper 31 has a closed geometry except for the foot opening 33 and is essentially sock-like.

A sole structure may directly be applied to the bottom side 32 of the shoe upper 31 e.g. by stitching, gluing or welding. It is also possible to apply the shoe sole structure by injection molding. If the sole structure comprises fibers, for example as a cushioning or padding, it is even possible to transfer the fibers from a fiber transfer device 14 as described above while the shoe upper 31 is still on a last. In this way, a part of the sole structure (or even the entire sole structure) may be integrally formed with the shoe upper 31 in a single process.

It is possible that further components may be attached to the shoe upper 31. For example, a logo or a coating may be applied to the shoe upper 31. It is also possible that a first and a second non-woven fabric for a shoe upper are manufactured as described herein. Both non-woven fabrics are different parts of the shoe upper. For example, the first non-woven fabric may be a rear portion including a heel counter as a component embedded in the non-woven fabric, whereas the second non-woven fabric may be a corresponding front portion including a toe counter as a component embedded in the non-woven fabric. Both portions may then be joined by gluing, stitching, welding, etc. to obtain the shoe upper. Generally, an arbitrary number of such components may be joined to obtain a shoe upper.

While FIGS. 2A, 2B, 3A and 3B show a non-woven fabric 13 obtained according to the method of the invention as a shoe upper or a part thereof, it should be noted that according to the invention, the non-woven fabric may be generally be used for arbitrary articles and products including for example entire apparels or portions thereof, shoes or portions thereof (including sole structures), sports equipment or portions thereof (including bladders and carcasses), bags or portions thereof, accessories or portions thereof, etc. This list is neither concluding nor limiting.

Figure 5A:
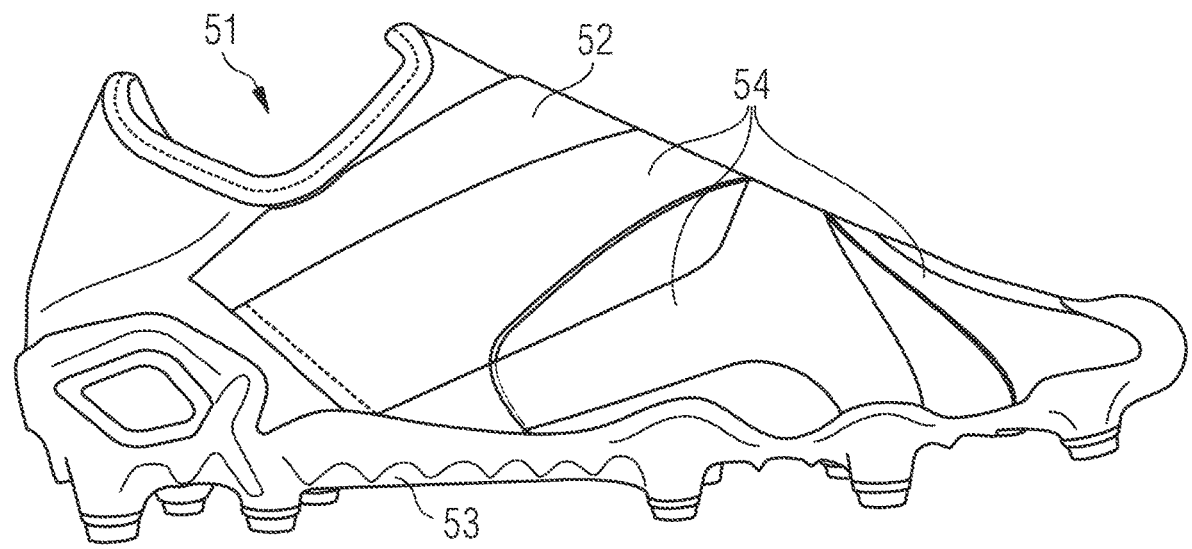
FIG. 5A is a side view of a shoe according to an embodiment of the present invention.
Figure 5B:
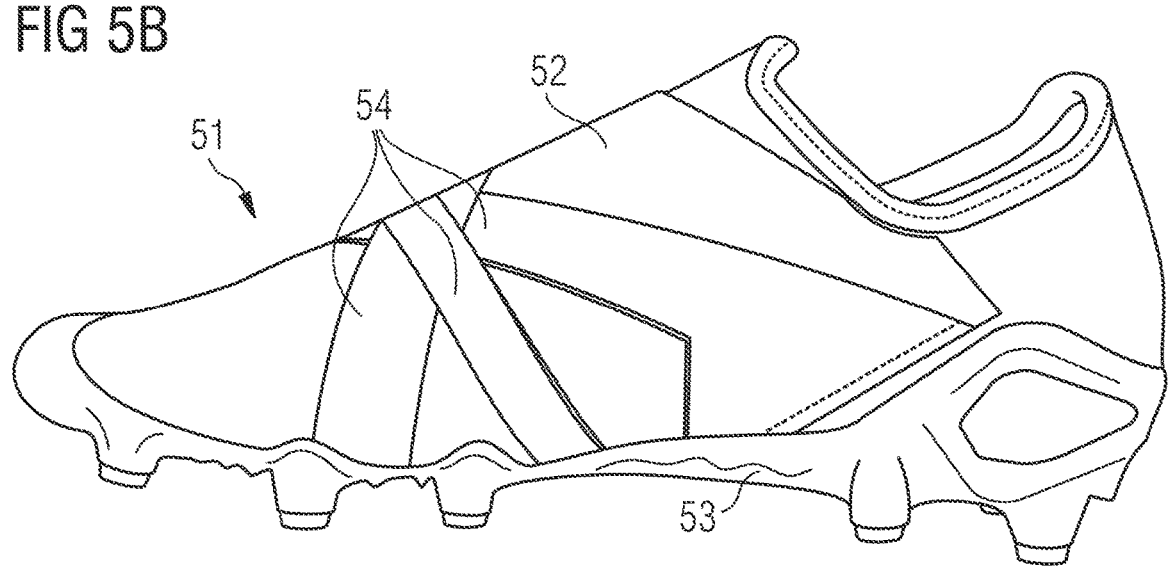
FIG. 5B is another side view of the shoe of FIG. 5A.

FIGS. 5A and 5B show an embodiment of a variation of the idea of the present invention, namely a shoe 51 comprising a shoe upper 52 and a sole structure 53.

The shoe upper was obtained by a 2D meltblown process. The fibers are blown on a flat surface to form a base layer. The base layer is then for example cut to a shoe upper shape and stitched to a lasting board to create a 3D shape. The tapes 54 may be created via applying a thicker layer of fibers, for example by spraying/blowing more fibers in certain areas. The tapes may be created via heat pressing the base-layer in the areas where tapes needs to be placed. The heating pressing may happen in the areas of the base layer with a higher thickness. It is also possible that the tapes may be produced separately and then joined, e.g. heat pressed, to the base layer. In other embodiments the tapes may be placed on the base layer and then the intermediate assembly comprising at least a tape and the base layer may be heat pressed so as to be joined together. A texturing may be created on the tape and/or on the base layer when heat pressed. The different tapes can have a different stretch, for example 5%, 10%, or 15% of the stretch of the non-woven base layer. The tapes may beneficially be of the same material as the base layer. One benefit of this 2D blown fiber/non-woven technology is that a TPU cover layer is not needed, because the non-woven is water resistant. Furthermore, by using the non-woven an isotropic upper (i.e. with equal stretch everywhere) can be obtained and then the local stretch may be modified by the application of tape(s). A tape may wrap around the shoe upper or may be interrupted in the form of a patch.

In the following, further examples are described to facilitate the understanding of the invention:

1. Method of manufacturing a non-woven fabric (13), comprising the steps:
   a. providing a substrate (12), wherein the substrate (12) is air permeable in at least a portion of its surface;
   b. providing a fiber transfer device (14) adapted to transfer fibers (11) onto the substrate (12);
   c. transferring a first plurality (21) of fibers (11) onto the substrate (12); and
   d. applying a pressure differential to the air permeable portion of the substrate, wherein the strength of the pressure differential is varied across the surface of the substrate (12).

2. Method according to preceding claim, wherein the air permeable portion comprises a plurality of holes (114).

3. Method according to one of the preceding claims, wherein the substrate (12) is a three-dimensional shape.

4. Method according to one of the preceding claims, further comprising the steps:
   placing a component (22A, 22B) at least partially onto the first plurality (21) of fibers (11) transferred to the substrate (12); and
   transferring a second plurality of fibers (11) onto at least a portion of the component (22A, 22B) and onto at least a portion of the first plurality (21) of fibers (11).

5. Method according to the preceding claim, wherein the component has a three-dimensional shape.

6. Method according to one of the preceding claims, wherein the fiber transfer device (14) is a meltblown head.

7. Method according to one of claims 4 to 6, wherein the surface area of the component (22A, 22B) is smaller than the surface area of the non-woven fabric (13) and the component (22A, 22B) is placed such that it is embedded in the non-woven fabric (13).

8. Method according to one of claims 4 to 7, wherein the component (22A, 22B) comprises at least one appendix adapted to be surrounded by fibers (11).

9. Method according to one of claims 4 to 8, wherein the component (22A, 22B) comprises at least one opening (23A, 23B) such that fibers (11) of the second plurality of fibers applied inside the opening (23A, 23B) are transferred onto the first plurality (21) of fibers (11).

10. Method according to one of claims 4 to 9, wherein the component (22A, 22B) comprises such a shape that it is held in place by fibers (11).

11. Method according to one of claims 4 to 10, wherein the component (22A, 22B) comprises a textured surface.

12. Method according to one of claims 4 to 11, wherein at least one surface of the component (22A, 22B) comprises a meltable layer.

13. Method according to one of claims 4 to 12, wherein the melting temperature of the meltable layer is below the temperature of the fibers (11) when hitting the component (22A, 22B).

14. Method according to the preceding claim, wherein the non-woven fabric is a portion of an apparel, shoe or sports equipment.

15. Method according to one of claims 2-11, wherein the three-dimensional shape (12) is a last for a shoe or a portion thereof.

16. Method according to one of claims 3 to 15, wherein the three-dimensional shape (12) is ball-shaped and the non-woven fabric (13) is suitable to be used as a layer of a ball or as a part thereof.

17. Method according to one of the preceding claims, further comprising the step of feeding the fiber transfer device (14) with a thermoplastic polyurethane, TPU.

18. Method according to one of claims 6 to 17, wherein the meltblown head (14) comprises a plurality of nozzles (17).

19. Method according to the preceding claim, further comprising the steps:
feeding at least a first nozzle (17) with a first material; and
feeding at least a second nozzle (17) with a second material, wherein the first material and the second material differ.

20. Method according to one of the preceding claims, further comprising the steps:
transferring a first material for a first time duration; and
transferring a second material for a second time duration, wherein the first material and the second material differ.

21. Method according to one of the preceding claims, further comprising the steps:
transferring a first material onto a first portion of the substrate (12); and
transferring a second material onto a second portion of the substrate (12), wherein the first material and the second material differ.

22. Method according to one claims 18 to 21, further comprising the step:
feeding at least one nozzle (17) with a first material and a second material in a side-by-side configuration.

23. Method according to one of the preceding claims, further comprising the step:
transferring at least a third plurality of fibers (11) onto the substrate (12) after the first plurality (21) of fibers (11) or after the second plurality of fibers (11), wherein the material of the third plurality of fibers differs from the material of the first plurality of fibers and/or of the second plurality of fibers.

24. Method according to one of the preceding claims, further comprising the step:
moving the fiber transfer device (14) relative to the substrate (12).

25. Method according to one of the preceding claims, further comprising the step of laying a higher proportion of fibers in a predetermined direction than in other directions.

26. Method according to the preceding claim, further comprising the step:
controlling the distance (112) between the fiber transfer device (14) and the substrate (12) and/or controlling the speed of relative movement between the fiber transfer device (14) and the substrate (12).

27. Method according to the preceding claim, wherein the distance (112) and/or the speed is varied during transferring the fibers (11) onto the substrate (12).

28. Method according to one of claims 3 to 27, wherein the three-dimensional shape (12) is concave and the method further comprises the step:
transferring the fibers (11) onto an inner surface of the three-dimensional shape (12).

29. Method according to one of the preceding claims, further comprising the steps:
covering the substrate (12) at least partly with a base layer; and
transferring at least a portion of the first plurality (21) of fibers (11) and/or of the second plurality of fibers (11) onto the base layer.

30. Method according to the preceding claim, wherein the base layer is a woven, non-woven or knitted fabric.

31. Method according to one of the preceding claims, further comprising the step:
transferring the first plurality (21) of fibers (11) and/or the second plurality of fibers (11) onto a first area of the substrate (12), but not onto a second area.

32. Method according to one of the preceding claims, wherein the substrate (12) is textured.

33. Method according to one of the preceding claims, further comprising the step:
placing a removable membrane over the non-woven fabric (13) while it is located on the substrate (12).

34. Method according to the preceding claim, wherein the membrane is textured.

35. Method according to one of the preceding claims, further comprising the step:
applying heat to the non-woven fabric (13), while it is located on the substrate (12).

36. Non-woven fabric (13) manufactured according to a method of one of the preceding claims.

37. Method of manufacturing a shoe upper (13, 31), comprising the steps:
manufacturing a first non-woven fabric (13) according the method of claim 14, wherein the first non-woven fabric is a part of the shoe upper (13, 31).

38. Method of manufacturing a shoe upper (13, 31) according to the preceding claim, further comprising the steps:
manufacturing a second non-woven fabric according the method of claim 14, wherein the second non-woven fabric is a part of the shoe upper (13, 31); and
joining the first non-woven fabric (13) and the second non-woven fabric.

39. Shoe upper (13, 31) manufactured according to a method of one of claim 37 or 38.

The above-described aspects are merely possible examples of implementations, merely set forth for a clear understanding of the principles of the present disclosure. Many variations and modifications can be made to the above-described embodiment(s) without departing substantially from the spirit and principles of the present disclosure. All such modifications and variations are intended to be included herein within the scope of the present disclosure, and all possible claims to individual aspects or combinations of elements or steps are intended to be supported by the present disclosure. Moreover, although specific terms are employed herein, as well as in the claims that follow, they are used only in a generic and descriptive sense, and not for the purposes of limiting the described invention, nor the claims that follow.

That which is claimed:

1. A method of manufacturing a non-woven fabric comprising:
   a. providing a substrate, wherein at least a portion of a surface of the substrate is air permeable;
   b. providing a fiber transfer device adapted to transfer fibers onto the substrate;
   c. transferring a first plurality of fibers onto the substrate; and d. applying a pressure differential to the air permeable portion of the substrate, so that fibers transferred onto the substrate are attracted by the pressure differential, wherein a strength of the pressure differential is varied across the surface of the substrate, wherein the pressure differential is applied while a second plurality of fibers is applied.

2. The method of claim 1, wherein the portion of the surface of the substrate that is air permeable comprises a plurality of holes.

3. The method of claim 1, further comprising:
placing a component at least partially onto the first plurality of fibers transferred to the substrate; and
transferring the second plurality of fibers onto at least a portion of the component and onto at least a portion of the first plurality of fibers.

4. The method of claim 3, wherein a surface area of the component is smaller than a surface area of the non-woven fabric, and wherein the component is placed such that it is embedded in the non-woven fabric.

5. The method of claim 3, wherein the component comprises at least one appendix adapted to be surrounded by fibers.

6. The method of claim 3, wherein the component comprises at least one opening such that fibers of the second plurality of fibers applied inside the at least one opening are transferred onto the first plurality of fibers.

7. The method of claim 3, wherein the component comprises a textured surface.

8. The method of claim 3, wherein at least one surface of the component comprises a meltable layer, and wherein a melting temperature of the meltable layer is below a temperature of the fibers when hitting the component.

9. The method of claim 3, further comprising:
transferring at least a third plurality of fibers onto the substrate after the first plurality of fibers or after the second plurality of fibers, wherein a material of the third plurality of fibers differs from a material of the first plurality of fibers or of the second plurality of fibers.

10. The method of claim 1, further comprising feeding the fiber transfer device with a thermoplastic polyurethane.

11. The method of claim 1, wherein the fiber transfer device is a meltblown head comprising a plurality of nozzles, and wherein the method further comprises:
feeding at least a first nozzle with a first material; and
feeding at least a second nozzle with a second material, wherein the first material is different from the second material.

12. The method of claim 11, further comprising:
feeding at least one nozzle with the first material and the second material in a side-by-side configuration.

13. The method of claim 1, further comprising:
transferring a first material for a first time duration; and
transferring a second material for a second time duration, wherein the first material is different from the second material.

14. The method of claim 1, further comprising:
transferring a first material onto a first portion of the substrate; and
transferring a second material onto a second portion of the substrate, wherein the first material is different from the second material.

15. The method of claim 1, further comprising controlling at least one of a distance between the fiber transfer device and the substrate or a speed of relative movement between the fiber transfer device and the substrate.

16. The method of claim 1, further comprising:
at least partly covering the substrate with a base layer; and
transferring at least a portion of the first plurality of fibers or a portion of the second plurality of fibers onto the base layer.

17. The method of claim 16, wherein the base layer comprises at least one of a woven, non-woven or knitted fabric.

18. The method of claim 1, further comprising placing a removable membrane over the non-woven fabric while it is located on the substrate.

19. The method of claim 1, further comprising applying heat to the non-woven fabric while it is located on the substrate.

* * * * *